United States Patent [19]

Bowman, Jr.

[11] 4,228,983

[45] Oct. 21, 1980

[54] OUTBOARD MOTOR LOCKING DEVICE

[76] Inventor: John H. Bowman, Jr., 9723 S. Mead, Oak Lawn, Ill. 60453

[21] Appl. No.: 965,288

[22] Filed: Dec. 1, 1978

[51] Int. Cl.² .......................... B63H 21/26; F16F 15/00

[52] U.S. Cl. .......................................... 248/553; 70/58; 70/232

[58] Field of Search .................... 248/553, 640; 70/58, 70/232, 212, 230, 56, DIG. 58, DIG. 56

[56] References Cited

U.S. PATENT DOCUMENTS

| | | | |
|---|---|---|---|
| 2,704,933 | 3/1955 | McMullan | 70/58 |
| 2,726,532 | 12/1955 | Bonnell | 70/58 |
| 2,733,589 | 2/1956 | Mutty | 70/58 |
| 2,992,551 | 7/1961 | Cleveland | 70/58 |
| 3,096,409 | 7/1963 | Hubbell et al. | 70/232 |
| 3,650,130 | 3/1972 | Thompson | 70/58 |
| 3,731,504 | 5/1973 | Belknap | 70/58 |
| 3,889,500 | 6/1975 | Hix et al. | 70/232 |
| 3,893,312 | 7/1975 | Johnson | 70/58 |
| 4,030,324 | 6/1977 | Rizio | 70/232 |
| 4,058,994 | 11/1977 | Coppola | 70/232 |

*Primary Examiner*—J. Franklin Foss

*Attorney, Agent, or Firm*—Thomas R. Vigil

[57] ABSTRACT

The outboard motor locking device includes a block which is fixed to the inner wall of the transom of a rowboat and which has a pair of downwardly extending clamp screw receiving slots that are adapted to receive the clamping screws of an outboard motor mounting clamp. Within the block between the slots is a cavity and an arm is rotatably mounted therein about the mid-point thereof. A pin is pivotally connected to each end of the arm and each pin is received in a pin hole which traverses and extends across one of the slots. A key operated lock is connected to the arm for rotating the arm to move th pins into and out of latching positions across the slots for locking the clamp screws within the slots. The locking device further includes a cover which is pivotally mounted to one side of the block and is receivable over the outer ends of the clamp screws and a portion of the outboard motor mounting clamp. The other side of the cover has a key operated latch member and the block has a catch member positioned to receive the key operated latch.

8 Claims, 5 Drawing Figures

OUTBOARD MOTOR LOCKING DEVICE

BACKGROUND OF THE INVENTION

1. Field of the Invention

The field of the invention is locking devices, and particularly a locking device for locking an outboard motor to the transom of a boat.

2. Description of the Prior Art

Heretofore various means have been provided for locking an outboard motor to a rowboat. Typically, such locking means have included a chain coupled around a portion of the mounting clamps for the outboard motor, through an eyelet or ring mounted to the boat and secured in place by a padlock. Sometimes the chain would be a long chain and would extend around a seat of the boat formed by a plank extending across the boat. These prior means, particularly a chain for locking an outboard motor to a rowboat, have not always been successful in preventing theft of the outboard motor. In this respect, the eyelet or ring often can be unscrewed from the boat and often it is easy to cut through the chain.

As will be described in greater detail hereinafter, the outboard motor locking device of the present invention provides means for locking the outboard motor directly to the transom of the boat in such a way that it is very difficult and awkward to break through the locking device to unlock and remove the outboard motor from the transom of the rowboat.

SUMMARY OF THE INVENTION

According to the invention there are provided outboard motor locking means adapted to be fixed to the transom of a boat and comprising means for receiving an outboard motor mounting clamp for an outboard motor, means for enclosing the mounting clamp and said receiving means and means for securing said enclosing means to said receiving means, said receiving means being fixable to the transom of the boat and including a member which is fixed to the inside wall of the transom, said member having two parallel spaced, clamp screw-receiving slots for receiving, respectively, two clamp screws of the outboard motor mounting clamp, said enclosing means including a cover pivotally mounted to said member and adapted to be received over the outer ends of the clamp screws of the outboard motor mounting clamp, and said securing means being operable to lock said cover to said member and over said outboard motor mounting clamp.

Further according to the invention there are provided outboard motor locking means adapted to be fixed to the transom of a boat and comprising means for receiving an outboard motor mounting clamp for an outboard motor and means for locking the mounting clamp to the receiving means, said receiving means being fixable to the transom of the boat and including a block fixed to the inside wall of the transom, said block having two parallel spaced, clamp screw-receiving slots for receiving, respectively, two clamp screws of the outboard motor mounting clamp, and said locking means including means mounted within said block for latching said clamp screws within said clamp screw-receiving slots, said means for latching said clamp screws in said clamp screw-receiving slots including a pair of axially spaced and parallel spaced pin holes in said block, each pin hole extending transverse to and across one of said slots, a pair of latch pins, each movable laterally of said slots into respective ones of said pin holes, a cavity between and communicating with said pin holes, an arm pivotally mounted about a midpoint thereof within said cavity, the inner end of each latch pin being pivotally mounted to one end of said arm and a key operated lock connected to said arm for rotating said arm to move the respective latch pins inwardly and outwardly of said pin holes and into and out of respective latch positions extending across said clamp screw-receiving slots.

DESCRIPTION OF THE PREFERRED EMBODIMENT

Figure 1:
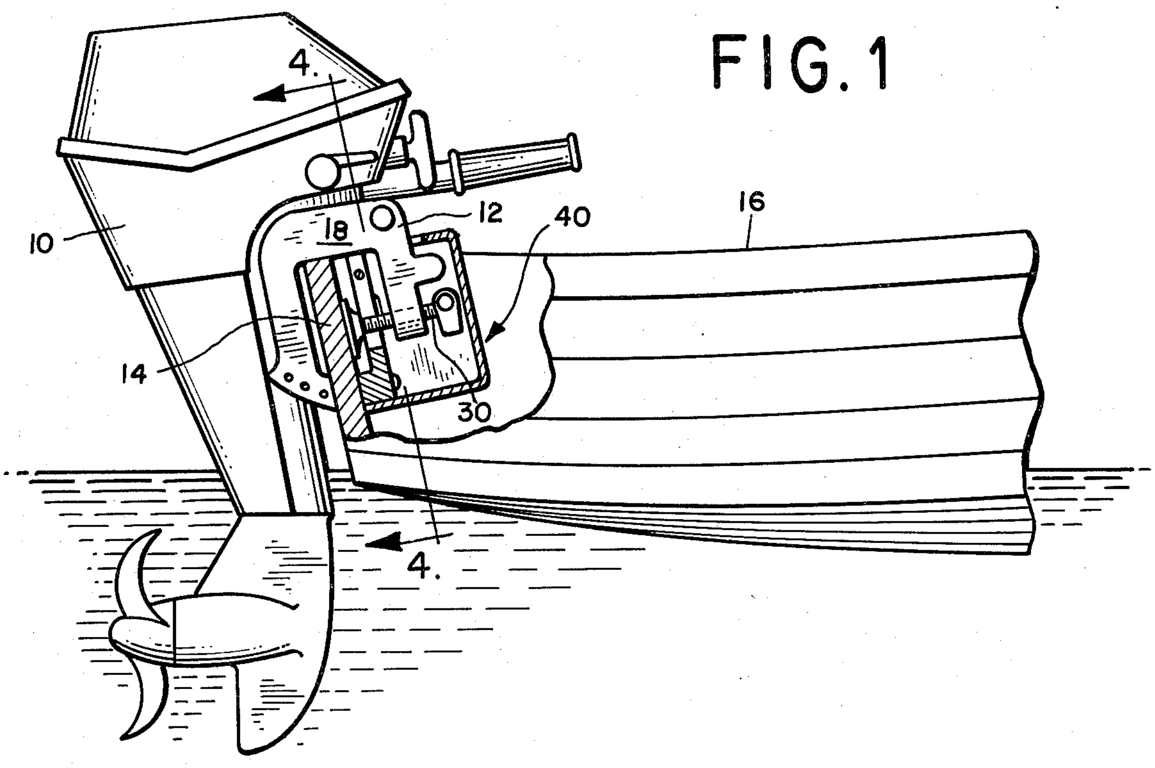
FIG. 1 is an elevational view of an outboard motor mounted to the transom of a rowboat with portions broken away to show the outboard motor locking device of the present invention.

Referring now to the drawings in greater detail, there is illustrated in FIG. 1 an outboard motor 10 having a motor mounting clamp 12 for mounting the motor 10 to the transom 14 of a rowboat 16.

Figure 2:
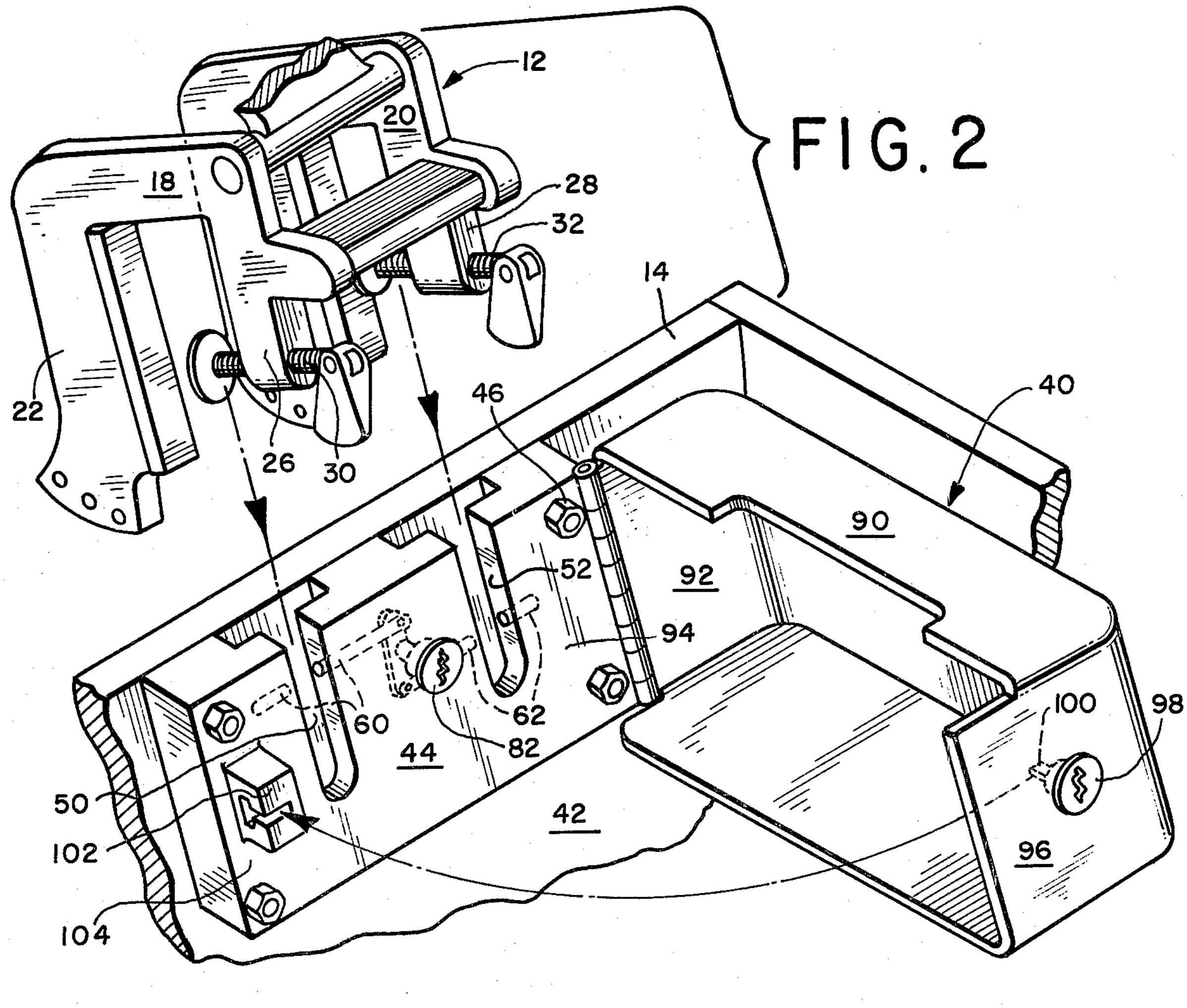
FIG. 2 is an exploded perspective view of an outboard motor mounting clamp and the outboard motor locking device of the present invention.
Figure 3:
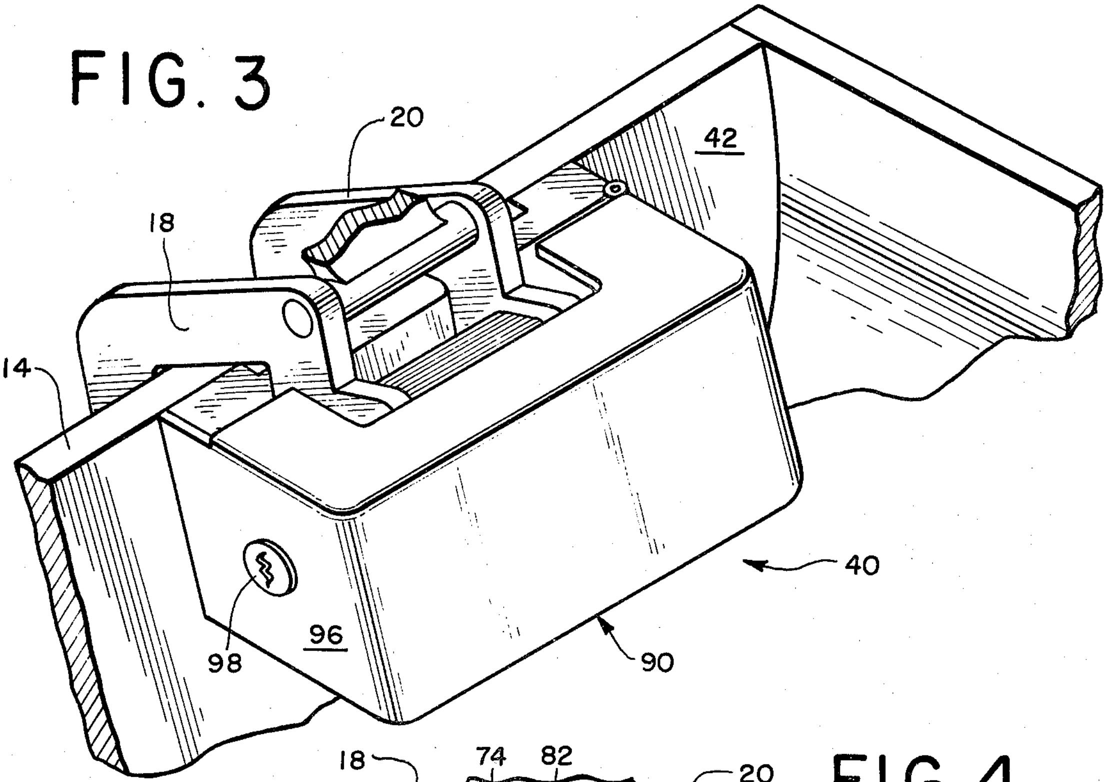
FIG. 3 is a fragmentary perspective view similar to FIG. 2 and showing the mounting clamp received within a mounting block of the outboard motor locking device with a cover of the device received over a portion of the mounting clamp and locked in place.

As best shown in FIG. 2, the outboard motor mounting clamp 12 includes two parallel spaced U shaped members 18 and 20. One leg of each U shaped member, 18 and 20, e.g., leg member 22 of U shaped member 18, is fixed to the outboard motor 10 and the other leg 26,28 is received over the transom 14. Mounted at the bottom end of each leg 26,28 is a clamp screw 30,32 which is threadingly received through a threaded bore extending through the lower end of each of the legs 26 and 28. Each of the clamp screws 30 and 32 forms a C clamp with the U shaped member 18 or 20 for clamping to the transom 14. Also as shown, each clamp screw, 30,32 has a conventional disc shaped clamping head on an inner end thereof located within the U of the U shaped member 18 or 20 and a finger manipulatable wing at the outer end thereof to facilitate manual manipulation and turning of the clamp screw 30 or 32.

Figure 4:
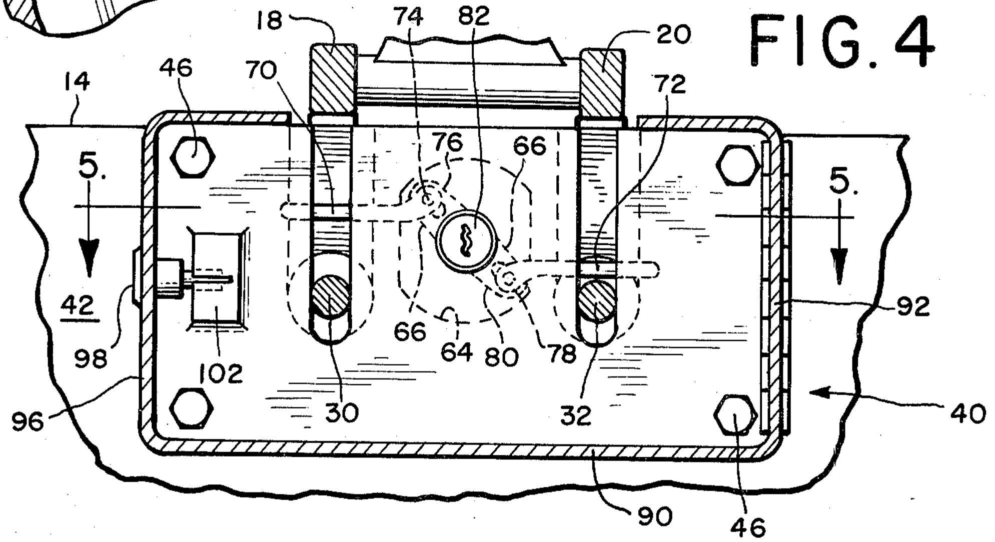
FIG. 4 is a generally vertical sectional view taken along line 4—4 of FIG. 1.

As shown in the drawings, an outboard motor locking device 40 made in accordance with the teachings of the present invention is secured to an inner wall 42 of the transom 14. The outboard motor locking device 40 includes a rectangular mounting block 44 which is fixed by a plurality of bolts 46 to the wall 42 of the transom 14. The block 44 has two downwardly extending T cross section clamp screw receiving slots 50 and 52 (FIGS. 2, 4 and 5) which are adapted to receive respectively the clamp screws 30 and 32 and the disc heads at the end thereof.

A mechanism for locking the clamp screws 30 and 32 in the slots 50 and 52 is provided in the block 44 and includes an upper, laterally extending pin hole 60 which traverses and extends across the clamp screw receiving slot 50 and a lower pin hole 62 which traverses and extends across the clamp screw receiving slot 52. The pin holes 60 and 62 are axially spaced apart and parallel spaced within the block 44. The pin holes 60 and 62 communicate with a cavity 64 located centrally of and within the block 42. An arm 66 is rotatably mounted about a midpoint thereof within the cavity 64. A pin 70 is movably received in the pin hole 60 and a pin 72 is movably received within the pin hole 62. An inner end 74 of the pin 70 is pivotally connected to one end 76 of the arm 66. Likewise, an inner end 78 of the pin 72 is pivotally connected to an opposite end 80 of the arm 66.

A key operated lock 82 is mounted on the outside of the block 42 and extends through the block 44 to the cavity 64 and is fixed to the arm 66. By inserting a key into the lock 82, one can rotate the arm 66 to move the pins 70 and 72 into or out of respective pin holes 60 and 62 and into and out of latching positions extending across the respective slots 50 and 52.

Figure 5:
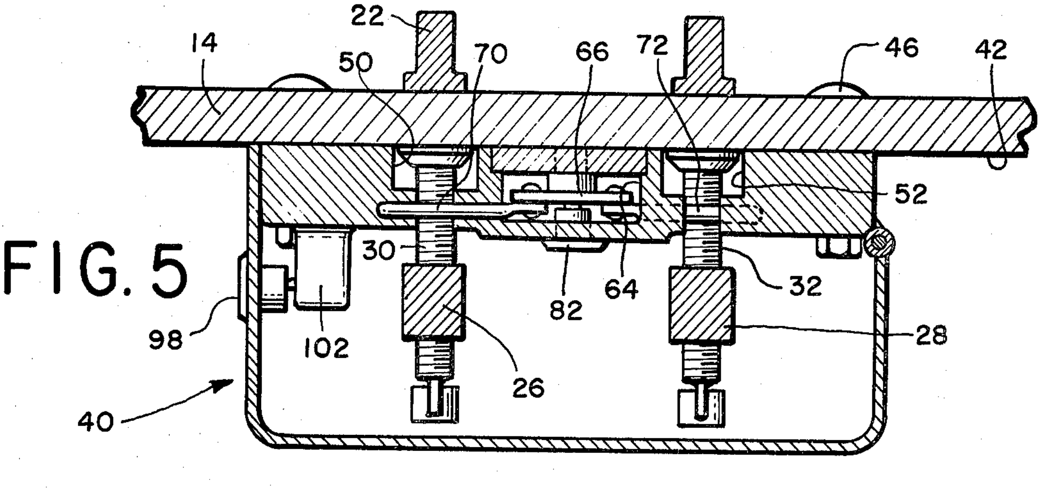
FIG. 5 is a generally horizontal sectional view taken along line 5—5 of FIG. 4.

When the pins 70 and 72 are in a latching position as shown in FIG. 5, they extend over the clamp screws 30 and 32 and prevent the motor mounting clamp 12 and the motor 10 from being raised off of the transom 14. In this way, the outboard motor locking device 40 locks the outboard motor 10 to the transom 14 of the boat 16.

Since it is possible that one could shear the pins 70, 72 or shear the clamp screws 30, 32 to unlock the outboard motor from the locking device 40, the locking device 40 also includes a cover 90 which has one side wall 92 thereof pivotally mounted along one side 94 of the block 44. The cover 90 is rotatable about the pivot mounting between an open position shown in FIG. 2 and a closed position shown in FIGS. 1, 3, 4, and 5 where the cover extends over part of the legs 26 and 28 of the mounting clamp 12 and over the clamp screws 30 and 32. On the outside of an opposite wall 96 of the cover 90 is mounted a key operated lock 98 which is connected to a latch member 100 on the inside of the side wall 96. The latch member 100 is adapted to be received within a catch member 102 mounted on the other side 104 of the block 44.

It will be appreciated that when the cover 90 is moved to a closed position over the ends of the clamp screws 30 and 32, the latch 100 is received in the catch member 102 and a key can be inserted into the lock 96 for rotating the latch member 100 to a latch position within the catch member 102. In this way the outboard motor 10 is double locked by the locking device 40 of the present invention.

It will be appreciated that the locking device 40 of the present invention has a number of advantages some of which have been described above and others of which are inherent in the invention. More specifically, the locking device 40 provides a double locking of an outboard motor 10 to the transom 14 of a boat 16 and is constructed and arranged so that it is very difficult to break through the locking device 40 to remove the outboard motor 10 from the transom 14 of the boat 16.

Also it will be understood that obvious modifications and variations can be made to the outboard motor locking device 40 of the present invention without departing from the teachings of the invention. Accordingly, the scope of the invention is only to be limited as necessitated by the accompanying claims.

I claim:

1. Outboard motor locking means adapted to be fixed to the transom of a boat and comprising means for receiving an outboard motor mounting clamp for an outboard motor, means for enclosing the mounting clamp and said receiving means and means for securing said enclosing means to said receiving means, said receiving means being fixable to the transom of the boat and including a member which is fixed to the inside wall of the transom, said member having two parallel spaced, clamp screw-receiving slots for receiving, respectively, two clamp screws of the outboard motor mounting clamp, said enclosing means including a cover pivotally mounted to said member and adapted to be received over the outer ends of the clamp screws of the outboard motor mounting clamp, and said securing means being operable to lock said cover to said member and over said outboard motor mounting clamp.

2. The outboard motor locking means according to claim 1 wherein said securing means includes a latch member on said cover and said member has a catch member mounted thereto in position to receive said latch member and a key operated lock for locking said latch member in said catch member.

3. The outboard motor locking means according to claim 1 wherein said member is a block and wherein said outboard motor locking means further comprise means for locking the mounting clamp to said block.

4. The outboard motor locking means according to claim 3 wherein said means for locking said mounting clamp to said block include means mounted within said block for latching said clamp screws within said clamp screw-receiving slots.

5. The outboard motor locking means according to claim 4 wherein said means for latching said clamp screws in said clamp receiving slots includes a pair of axially spaced and parallel spaced pin holes in said block, each pin hole extending transverse to and across one of said slots, a pair of latch pins each movable laterally of said slots in respective ones of said pin holes, a cavity between and communicating with said pin holes, an arm pivotally mounted about a midpoint thereof within said cavity, the inner end of each latch pin being pivotally mounted to one end of said arm and a key operated lock connected to said arm for rotating said arm to move the respective latch pins inwardly and outwardly of said pin holes and into and out of respective latch positions extending across said clamp screws receiving slots.

6. Outboard motor locking means adapted to be fixed to the transom of a boat and comprising means for receiving an outboard motor mounting clamp for an outboard motor and means for locking the mounting clamp to the receiving means, said receiving means being fixable to the transom of the boat and including a block fixed to the inside wall of the transom, said block having two parallel spaced, clamp screw-receiving slots for receiving, respectively, two clamp screws of the outboard motor mounting clamp, and said locking means including means mounted within said block for latching said clamp screws within said clamp screw-receiving slots, said means for latching said clamp screws in said clamp screw-receiving slots including a pair of axially spaced and parallel spaced pin holes in said block, each pin hole extending transverse to and across one of said slots, a pair of latch pins, each movable laterally of said slots into respective ones of said pin holes, a cavity between and communicating with said pin holes, an arm pivotally mounted about a midpoint thereof within said cavity, the inner end of each latch pin being pivotally mounted to one end of said arm and a key operated lock connected to said arm for rotating said arm to move the respective latch pins inwardly and outwardly of said pin holes and into and out of respective latch positions extending across said clamp screw-receiving slots.

7. The outboard motor locking means according to claim 6 including a cover pivotally mounted to said block and adapted to be received over the outer ends of the clamp screws of the outboard motor mounting clamp and means for locking the cover to said block and over said outboard motor mounting clamp.

8. The outboard motor locking means according to claim 6 wherein said cover includes a latch member and said block has a catch member mounted thereto in position to receive said latch member and a key operated lock for locking said latch member in said catch member.

* * * * *